INVENTOR.
Richard John Caserta
BY

PATENTED FEB 27 1973 3,718,371
SHEET 1 OF 2
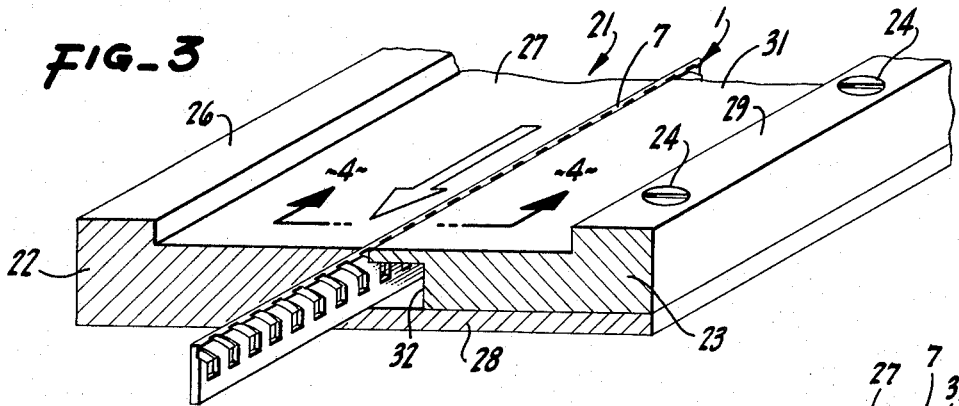
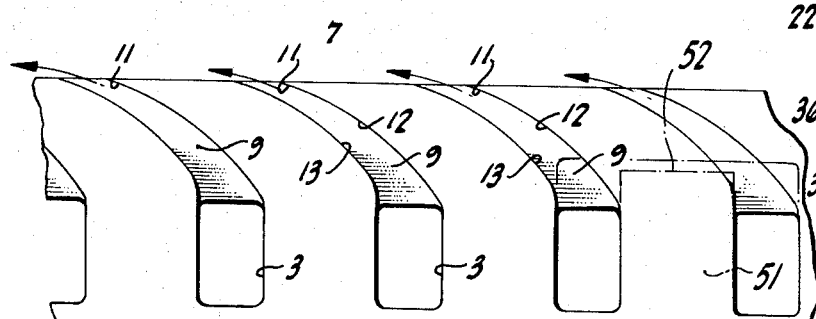
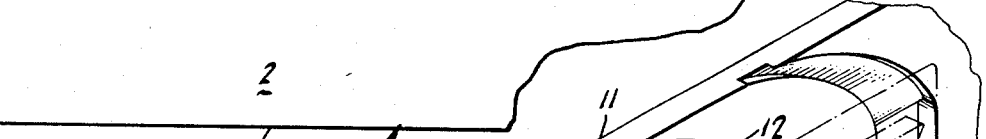
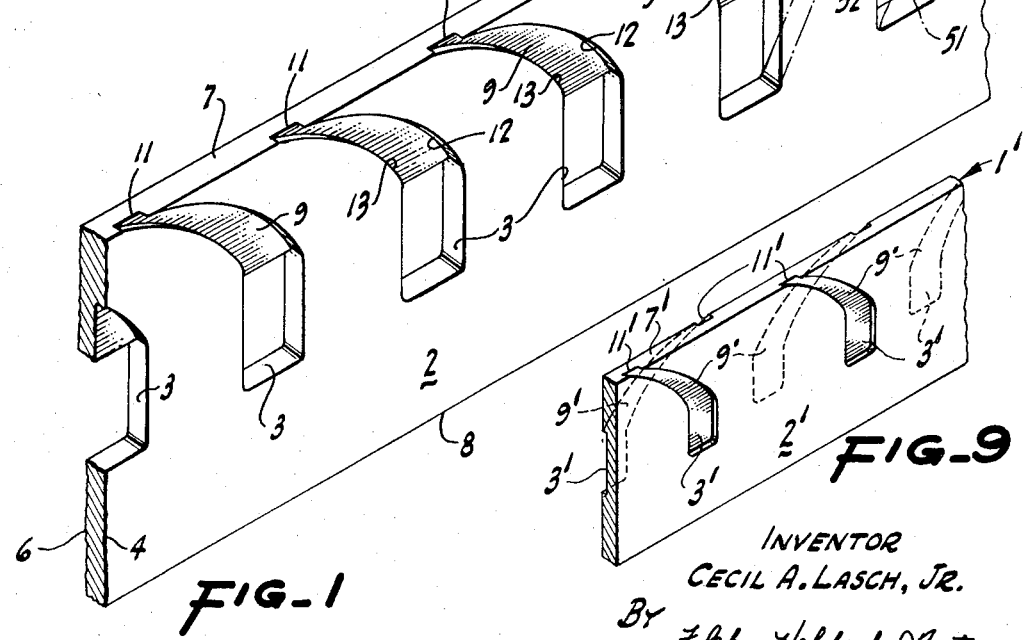
INVENTOR
CECIL A. LASCH, JR.
BY Flehr, Hohbach, Nest, Albritton & Herbert
ATTORNEYS

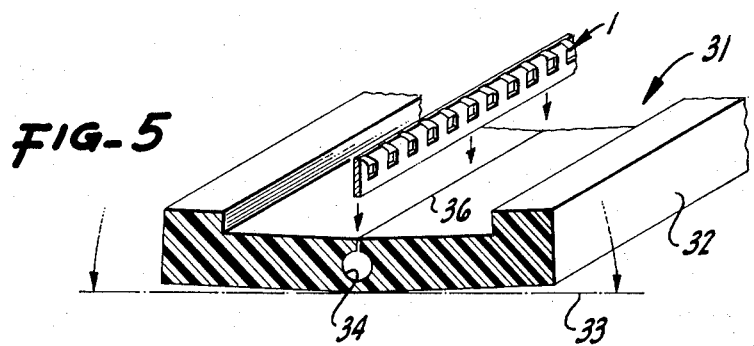
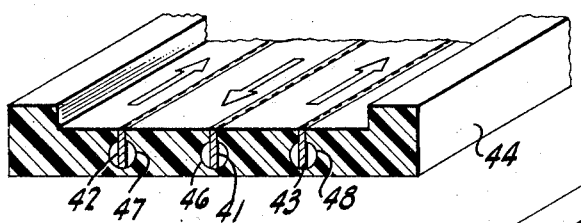
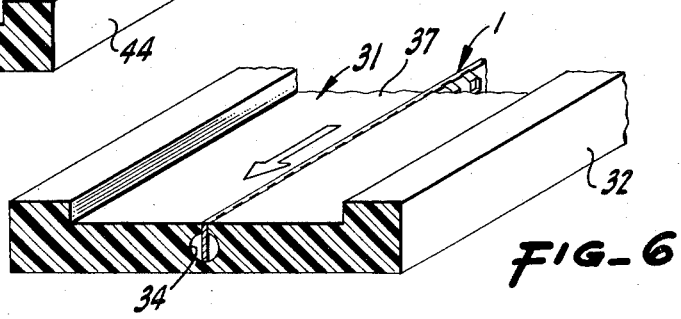
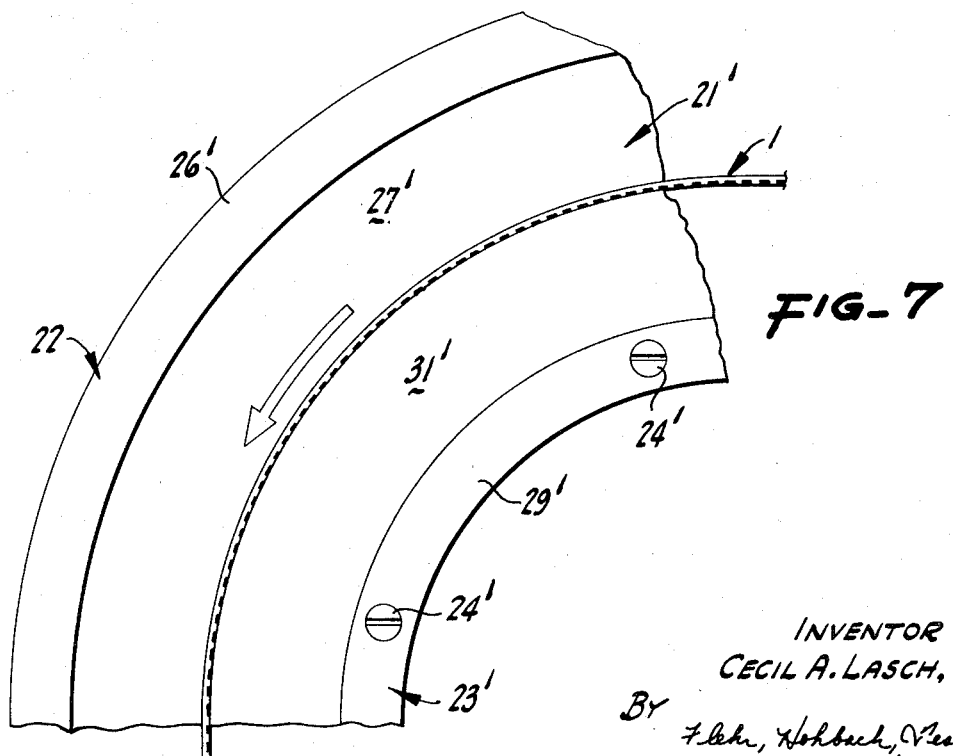

FLUID BEARING TRACK STRUCTURE AND COMPONENTS THEREOF

CROSS-REFERENCE TO RELATED APPLICATIONS

While the track structure of the present invention has wide applicability in conjunction with the formation of various types of apparatus and equipment designed for transporting or otherwise handling articles, the subject track structure has particular utility in conjunction with article handling apparatus and procedures illustrated and described in Lasch et al. application Ser. No. 779,033, "Apparatus And Method For Handling And Treating Of Articles," filed Nov. 26, 1968; Lasch application Ser. No. 852,216, "Process For Grooving Fluid Bearing Bars And Resulting Articles," filed Aug. 22, 1969, and Lasch et al. application Ser. No. 155,499, "Automatic Wafer Feeding & Pre-Alignment Apparatus and Method," filed June 22, 1971, all of which are assigned to applicant's assignee herein. Reference to such applications is made herein by way of illustration only and is not intended to be limiting in any respects on the novel and inventive concepts illustrated and described.

BACKGROUND OF THE INVENTION

1. Field of the Invention

This invention relates generally to the field of improved fluid bearing track structures, components thereof, and methods for producing and fabricating the same. More particularly, this invention in the embodiments disclosed herein relates to the field of procedures for providing an improved fluid bearing track structure for handling and/or transporting various articles, particularly fragile articles which do not lend themselves readily to manual handling or which may become contaminated if handled manually during processing or treatment thereof. In that regard, this invention relates specifically to the field of fluid bearing track structures used in the handling and treating of fragile articles, such as silicon or like wafers commonly used in the electronics industry in the manufacture of integrated circuits, transistors and like semiconductor devices during movement of such articles between predetermined locations at which various operations and manufacturing activities are performed thereon.

Still more particularly, this invention relates to the field of fluid bearing means, particularly of the pneumatic or gas bearing type, for transporting articles, which are incorporatable into handling and treating apparatus of various types, of which semiconductor manufacturing equipment and apparatus is exemplary and of which the apparatus and procedures disclosed in said aforementioned applications are typical.

This invention further relates to the field of improved procedures for fabricating fluid bearing track structures from a minimum number of components in a comparatively inexpensive procedure with the resulting track structures being utilizable for transporting articles in straight line as well as non-straight line paths in one or more directions relative to a reference location.

While in its more specific aspects the track structure of this invention relates to the field of improved fluid bearing handling and transporting of articles utilized in the electronics industry, such as semiconductor wafers, its applicability in other fields in which articles are required to be transported under controlled non-manual conditions also should be recognized.

2. Description of the Prior Art

Fluid bearing track structures of various types have been generally known heretofore and the following patents disclose devices which are exemplary of the prior art in that regard; Hazel U.S. Pat. No. 2,778,691 dated Jan. 22, 1957; Cole U.S. Pat. No. 3,103,388 dated Sept. 10, 1963; and Coville U.S. Pat. No. 3,318,640 dated May 9, 1967. Other prior art relating to fluid bearing tracks and production thereof is of record in said aforementioned copending applications. Additionally, improved track structure embodiments are illustrated and described in said copending applications.

While fluid bearing track structures and fabricating procedures have been disclosed in the noted prior art patents and in said copending applications, none of such patents or applications disclose or describe the improved features of the present invention.

Additionally, said copending application Ser. No. 852,216 is directed to a mechanical process for machining components of a fluid bearing track structure. While such machining method is an improvement over and provides an improved fluid bearing track structure superior to that generally known prior to its development, the present invention is designed as an alternative to the mechanical grooving or machining operations described in said application. To that end, the present invention utilizes a novel manufacturing and assembly method which, so far as is known, has been unknown prior to applicant's development thereof.

Additionally, the present invention has the improved advantages over prior known track constructions of the type illustrated in said patents and improvements thereto contained in said applications in that the same may be incorporated into track structures which are capable of transporting articles on a fluid bearing in an arcuately curved or other non-straight path. Heretofore, fluid bearing track structures having directional movement change capability have required the utilization of separate segments of generally straight track operatively interconnected with each other at predetermined angles to effect such directional change of movement of articles being transported thereon. With the present arrangement, as will be described, article transportation and change in direction of movement may be effected with a single length of track structure thereby obviating problems encountered heretofore in operatively interconnecting segments of track structures to effect such change of direction of movement.

SUMMARY OF THE INVENTION

The present invention relates to an improved fluid bearing track structure, simplified and improved components thereof, and improved and simplified procedures for producing the same. More particularly, this invention relates to an improved procedure for producing an improved fluid bearing track structure, and to the track structure components which permit such improved production. Still more particularly, this invention relates to a fluid bearing track structure having uni-directional and bi-directional movement capability, as well as the capability of directing and transporting articles in arcuate or other selective non-straight line paths.

This invention further relates to an improved and simplified method for producing a fluid bearing insert strip for a fluid bearing track structure to replace heretofore known procedures for mechanically forming directional fluid passages in a fluid bearing bar by mechanical machining or like means. To that end, this invention relates to the manufacture of jet strips by utilizing a chemical etching procedure which permits the formation of precisely and accurately contoured directional fluid flow passages in the insert strip so that positive directional control and article supporting capability may be effected by the resulting track structure.

From the foregoing, it should be understood that objects of this invention include: the provision of an improved fluid bearing track structure; the provision of improved components of a fluid bearing track structure; the provision of an improved fluid bearing jet strip insert for a fluid bearing track structure; the provision of a simplified procedure for manufacturing and producing a fluid bearing track structure; the provision of a fluid bearing track structure having both uni- and bi-directional movement capability, as well as capability of moving articles in straight, curved or other non-straight paths; and the provision of improved procedures for assembling and fabricating improved fluid bearing track structure.

These and other objects of this invention and various aspects thereof will be come apparent from a study of the following detailed description in which reference is directed to the attached drawings.

DESCRIPTION OF THE DRAWINGS

FIG. 4 is a vertical sectional view taken in the plane of line 4—4 of FIG. 3.

FIGS. 5 and 6 are isometric views of a modified embodiment of the subject track structure illustrating the procedure for assembling the insert strip therewith.

FIG. 7 is a plan view of a further modified track structure having the capability of transporting articles along a non-straight path.

FIG. 8 is an isometric view corresponding generally to FIG. 6 illustrating a further modification of the subject track structure, namely one having selective bi-directional article movement capability.

FIG. 9 is an isometric view of a modified insert strip having bi-directional article movement capability incorporated directly therein.

DESCRIPTION OF THE PREFERRED EMBODIMENT

Fluid bearing track structures of the type involved in this invention utilize directional fluid passages or jet grooves all of which preferably are identically contoured in a given track segment and each of which preferably is in the shape of a nozzle which is formed with a decreasing cross-sectional area from its inlet end to its discharge end. While various methods may be utilized for forming such fluid bearing jet nozzles, such as the mechanical grooving procedure described in said copending application Ser. No. 852,216, it has been found that the procedure of chemically etching such air bearing jet grooves in a component of a track structure can be used to economically manufacture such components to thereby facilitate and reduce the cost of manufacture and production of fluid bearing jet tracks.

Chemical etching of a narrow jet insert strip produces the maximum amount of flexibility in the formation and utilization of fluid bearings as well as an inexpensive method of manufacturing the same. Although many materials can be chemically etched, those which give the best uniformity in finished jet nozzle configuration and finish after etching are brass, phosphor bronze, beryllium copper, and stainless steel. Of course, it should be understood that materials other than those mentioned may also be utilized. However, the material chosen for the jet strip insert desirably is selected from the group of materials which are flexible, resilient and sturdy so that straight or non-straight fluid bearing tracks may be produced therefrom and so that such tracks may be fabricated without undue concern for damage to the inserts because of fragility thereof.

Figure 1:
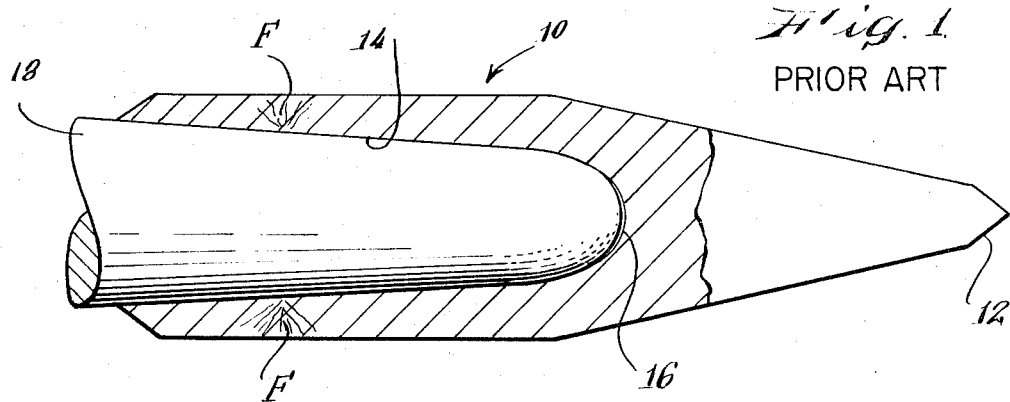
FIG. 1 is an isometric view of a fluid bearing insert strip of the subject invention which is to be incorporated into the subject track structure. Such strip is shown on an enlarged scale relative to the remaining figures of the drawings.
Figure 2:
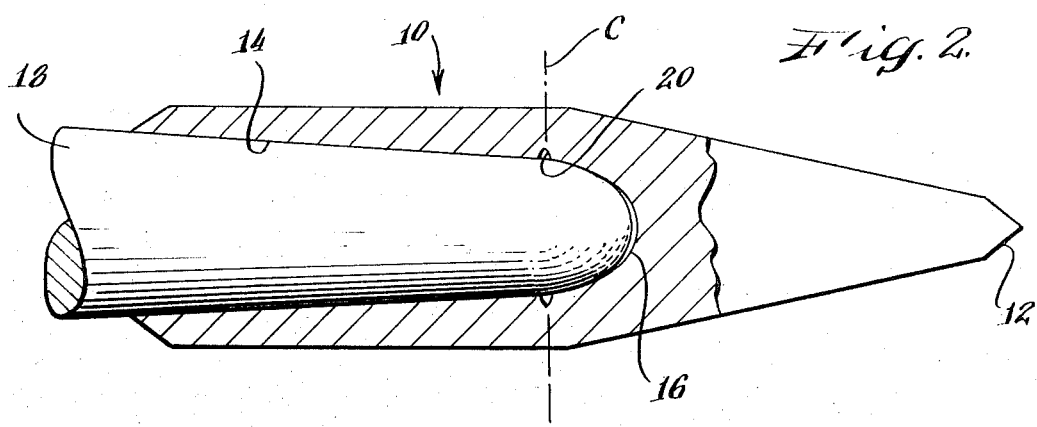
FIG. 2 is a side elevational view of the insert strip.

Referring to FIGS. 1 and 2, a jet insert strip of this invention, generally designated 1, is illustrated in each figure. Such strip is shown on a substantially enlarged scale compared to that which would normally be utilized for transporting and handling fragile articles, such as silicon wafers in the electronics industry. However, it should be understood that this invention has applicability in the production of fluid bearing track structures of varying sizes and that the concepts and inventive features described herein are not restricted to any particular size jet strip insert or track structure resulting from use thereof.

The jet strip insert illustrated comprises a metal body 1 which is generally rectangular in cross-section and which has a series of regularly spaced fluid passages or recesses 3 extending therethrough between opposite sidewalls 4 and 6 thereof. The sidewalls are parallel to each other and cooperate in defining a planar top edge 7 and a similarly planar bottom edge 8 which extends parallel to top edge 7. Formed in communication with the series of recesses 3 are a series of regularly spaced directional fluid jet passages or grooves 9 which communicate at one of their ends with the associated recesses 3 and project therefrom and open onto the top edge 7 of the strip as exit nozzle mouths 11.

While in the embodiment illustrated the recesses 3 are generally rectangular in configuration, it should be understood that the configuration thereof may vary to meet particular needs.

Similarly, while the directional fluid passages 9 which define the jet grooves are formed with curved, essentially arcuate, sidewalls 12 and 13, straight sidewalls or those having other configurations differing from those shown in FIGS. 1 and 2 may be provided to meet particular needs. The chemical etching procedure to be described is well suited for producing jet grooves of complex configurations.

Irrespective of the particular configuration chosen for the jet grooves 9, the same should be formed to impart directional flow characteristics to air, gas or other bearing fluid passing through the recesses 3 and into the jet grooves for imparting directional movement to articles supported on the upper surface of the jet track into which the insert strip is to be positioned.

It will be noted from FIG. 1 that the jet grooves 9 extend only partially through the insert strip from sidewall 4 thereof in that it has been found that better fluid flow control may be provided with such arrangement. However, if preferred for particular needs, the jet grooves 9 could extend completely through the jet strip in the same fashion as do recesses 3. In any event, the jet grooves are contoured to insure effective fluid flow therethrough and each such groove 9 is directionally formed to impart longitudinal motion to articles to be supported on and moved along the track structure into which the strip 1 is to be inserted.

In that regard, such directional capability is produced by providing each groove 9 with a predetermined exit angle of inclination relative to the longitudinal axis of the strip, that is, relative to the planar top edge 7 thereof. Further in that regard, each groove 9 preferably is formed with a nozzle shape or configuration as previously noted which is imparted thereto by forming such passage or groove wider at the inner end thereof which communicates with an associated recess 3 and progressively tapers and becomes narrower toward the exit end or mouth 11 thereof as best seen in FIG. 2. Such tapered nozzle configuration insures positive control and movement of semiconductor wafers or other articles to be transported by fluid bearing track structures of the type into which the insert strip is to be incorporated.

Preferably each of the jet nozzle grooves 9 is formed generally curved or arcuate in shape with each of the sides 12 and 13 thereof being defined by an arc of a large circle, the center of which is spaced from the axis of the insert strip. In that regard, the opposite sides 12 and 13 of each nozzle jet are defined by arcs of circles having different centers, as also best seen in FIG. 2. Thus, the nozzle shaped configuration is imparted thereto.

The exit angle of fluid passing through the arcuate jet nozzles may be varied to meet a particular need in accordance with known considerations, such as the weight and size of articles being handled and the speed and extent of longitudinal movement desired for such articles, as well as other variable factors recognized in the fluid bearing art. By way of example, however, an exit angle lying within the range of approximately 15° to 25° has been found effective for transporting many articles, of which semiconductor wafers are exemplary, with an exit angle of approximately 20° being satisfactory in most cases.

Because the jet strip inserts may be formed from elongated sections of metal of the type described previously, jet track structures of unlimited length may be similarly produced utilizing such jet strip inserts as components thereof. In that regard, it should be understood that adjacent lengths of similarly constructed jet strip inserts may be abutted end-to-end in a completed structure to produce a track structure of predetermined length. In that same regard, abutting insert strips may be utilized to change the motion characteristics of articles to be supported and handled on a given track structure. That is, by abutting end-to-end insert strips which have jet nozzle configurations of different characteristics, the speed and/or supporting capability thereof may be varied at selective locations along a track structure. Thus, articles may be moved along a track structure at variable rates and under different circumstances without altering the basic pressures or flow rates at which the supporting fluid is introduced through the insert strip sections. Thus, speedups, slowdowns and other motion changes of articles being transported may be readily effected by positioning insert strips having jet nozzles 9 of varied contours at particular locations in a given fluid bearing track structure.

While a chemical etching or milling procedure per se is not new, utilization of such a procedure in the manufacture of components for a fluid bearing track structure in the manner disclosed herein is believed novel. A chemical etching procedure used in forming an insert strip 1 of the type described proceeds as follows. Such insert strips are made by utilizing a series of steps, the first of which constitutes laying out the desired contour for the respective jet nozzles 9 and recesses 3 on a layout sheet of desired length and on an enlarged scale 10 or more times larger than the final dimension of a completed jet strip. By way of example, a layout 30 to 50 times larger than the final product is desirable for producing insert strips of the size commonly used having exit openings 11 which are typically 0.004 to 0.016 inch wide at the upper edge 7 of the insert strip. The jet groove contour to be used is selected so that a small radius is made tangent to the track edge 7 by the lower side 13 of the groove 9. The other side 12 of the groove is from a larger radius struck about a different center so that the two radii converge and define the desired jet exit mouth opening 11 in the manner seen in FIG. 2. Typical radii in that regard are approximately 0.180 and approximately 0.200 inch respectively.

The jet exit mouth area preferably is one-half to one-fifth the jet entrance area and the length thereof should be kept to a distance sufficient to allow the bearing fluid to establish directional laminar flow at the exit mouth 11 of the jet. By utilizing curved or radial nozzles of the type illustrated, rather than straight nozzles, less wasted space is insured in each insert track without losing positive control capability. Straight nozzles, while the same could be used, would require greater overall length and some sacrifice of control at opposite ends of a given insert strip section would result. Thus, curved nozzle grooves 9 are preferred.

Once the desired jet configuration has been laid out on an enlarged scale as noted, a step and repeat operation is used to photo-reduce the layout to the desired size of the jet strip to be produced. Such photographic reduction operation is repeated in step fashion as many times as desired to produce the length of the strip to be etched.

Following photographic reduction, a mask is made from the photo-reduction in the manner similar to that commonly used in making semiconductor devices in the electronics industry. One such mask is made for each side of the strip, such masks differing in the fact that one has jets 9 thereon while the other does not. Both sides of the strip are then covered by their respective masks by contact printing the same thereon and such sides are thereafter selectively coated with a conventional photoresist material of any commercially available type. Both sides of the strip are then photographically exposed. The unexposed portions are then removed by spraying the strip or immersing the same in a solvent such as xylene. The strip is then "fixed" by washing the same in a fluid such as amyl acetate or alcohol, after which it is baked to harden the photoresist material.

One and preferably a plurality of such strips are then held at opposite ends thereof and are sprayed or immersed in a suitable etchant for a time and in quantities sufficient to produce desired results. The etchant used will vary with the strip material being treated. By way of example, with a phosphor bronze strip, an etchant having a ferric chloride base will be used.

Etching is continued until the strip is etched one-half way through from each side thereof. Thus, the jet grooves 9 may be formed half way through the strip while the recesses 3 are formed completely through the strip, as seen in FIG. 1.

By providing the through recesses 3, each strip may be positioned in operative contact with a fluid plenum so that supporting fluid may pass through the recesses into the respective jet nozzle grooves 9 irrespective of which side of the strip the plenum is located.

After the strips have been chemically etched in the fashion noted, and washed or otherwise cleaned to remove etchant therefrom, they can be cut to any desired length and incorporated into a fluid bearing track assembly. In that regard, as noted from FIGS. 3 through 6, the strips are positioned in a completed track structure in conjunction with a fluid plenum so that supporting fluid may exit from the plenum into and through the insert strip for passage through the jet nozzles 9 to the upper surface of the track structure for supporting an article thereon. In that regard, while a suitable gas, such as compressed air, is utilized for the fluid bearing, it should be understood that other supporting fluids, including liquids under certain circumstances, can be utilized.

Similarly, while in the preferred embodiment the jet grooves 9 taper only in width from their inner ends to their exit ends 11, under certain circumstances it may be desired to have the same taper in depth also so that the grooves have a true nozzle configuration tapering in both width and depth from the entrance to the exit ends thereof.

The strips utilized may vary in size depending upon their intended end use. However, by way of example, strips to be used in track structures for transporting semiconductor wafers having a length of 20.260 inches divided into 161 equally spaced jets and recesses are typical. Such strips are typically 0.0165 inch thick and 0.240 inch wide.

After the strips have been produced as described, and formed with directional fluid jet passages of the desired configuration, they are joined with other components into a fluid bearing track structure with the upper edge 7 of the strip substantially flush with the upper surface or bed of the track structure over which the articles are to be transported.

In that regard, various means may be utilized for maintaining one or more insert strips in place, several of which are illustrated in the attached drawings. In that connection, strips may be clamped or held in place frictionally, or mechanical means alternatively may be provided on the strips to assist in holding the same more positively in place, as will be described hereinafter.

Figure 3:
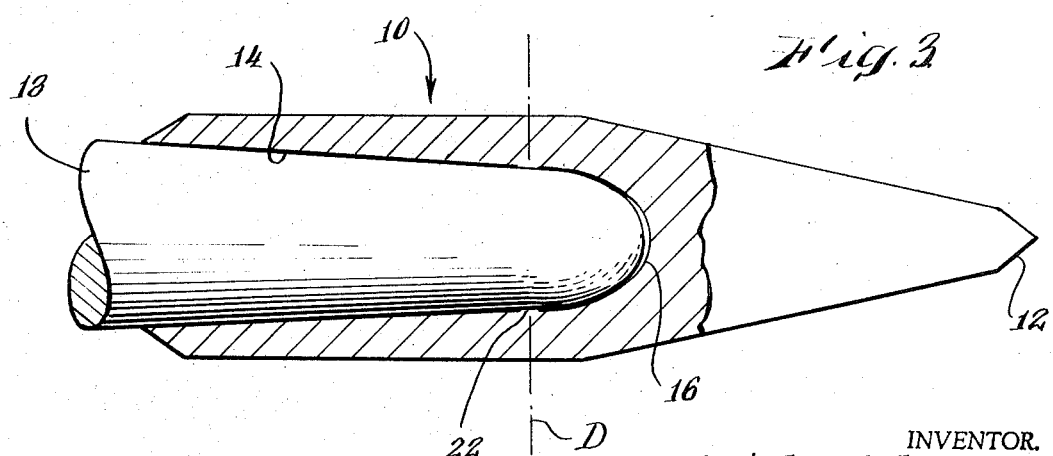
FIG. 3 is an isometric view of one embodiment of a track structure showing the insert strip operatively positioned therein, one end thereof shown in projecting relationship for purposes of clarity of illustration.

Referring first to FIGS. 3 and 4, the insert strip 1 is shown in conjunction with a fluid bearing track structure formed from two cooperable components of a suitable metal (or plastic, if preferred) which cooperate with the strip in defining a track structure assembly generally designated 21. Such track structure includes first and second track bed structural members 22 and 23 which are integrally connected with each other by means of spaced screw fasteners 24 or other equivalent means to hold the insert strip 1 therebetween. In that regard, as best seen in FIG. 4, track member 22 includes a shoulder portion 26 which defines a planar upper surface or bed section 27, and a projecting cut-away base section 28. It is to the base section, and overlying the same, that track member 23 is secured by fasteners 24. Track member 23 similarly includes a shoulder portion 29 which defines a second planar upper surface or bed section 31 of the track structure. The two planar surfaces 27 and 31 define the bed of the track structure with which the edge 7 of strip 1 is generally coplanar.

A plenum chamber 32 is formed to extend logitudinally of the track member 23. Such plenum may take any configuration desired and in the embodiment illustrated is generally rectangular in vertical cross-section as best seen in FIG. 4. The plenum is defined by an upper laterally projecting portion 33 of track member 23 which defines an abutment shoulder against which the insert strip 1 is engaged as seen in FIG. 4. The shoulder urges the insert strip against a planar surface 34 formed on track member 22 between the upper surface 27 and the base 28 thereof as seen in FIG. 4. Thus, the insert strip 1 is securely clamped in place in a slot between the opposed track bed sections with its recesses 3 and jet grooves 9 in communication with the plenum. The plenum in turn is in communication with any suitable fluid pressure source, not shown.

As also shown in FIG. 4, if desired, the track member 22 may also be provided with a second plenum chamber 36 outlined by the dotted lines shown. However, as noted previously, it is only necessary for the plenum to be formed on one side of the insert strip to provide effective fluid passage therethrough because the recesses 3 extend fully through the insert strip. Thus, the strip may be oriented oppositely from the arrangement shown in FIG. 4 and its fluid jet grooves 9 will still be in communication with the plenum 32. Such reversal capability enhances the bi-directional capability of track structures produced by utilizing the insert strips of this invention as will be described. With the insert strip 1 positioned as seen in FIG. 3, the direction of movement of articles thereover is in the direction of the arrow shown. If only one strip is used per track structure, it is preferred to position the same along the axis of the track as shown in FIG. 3 to effect generally straight movement of articles thereover.

The track structure 21 illustrated in FIGS. 3 and 4 may be secured in any suitable apparatus for handling or otherwise treating articles to be transported on the track structure in any suitable fashion, such as illustrated and described in the aforementioned applications.

As noted in FIG. 7, in which similar reference numerals primed are utilized to identify corresponding track components, it will be noted that the track structure of this invention, particularly the insert strip thereof, may be utilized to provide a track structure 21' which is capable of transporting articles in a non-straight direction, such as the curvi-linear or arcuate arrangement shown in FIG. 7. Thus curved paths of travel and changes in direction may be effected with the present invention in a fashion not generally possible heretofore. With prior known arrangements, change of direction of movement of the articles being transported around corners or the like was accomplished only with difficulty requiring the joining together of discrete track sections. Thus, the present invention provides an important advance in the art.

FIGS. 5 and 6 show a modified construction of a track structure assembly 31 in which the track structure is comprised of a flexible insert strip 1 of the type described previously which is frictionally secured in an elongated track bed member 3 formed of flexible material, such as a suitable plastic of which nylon and Teflon are typical. However, it should be understood that flexible metals also could be utilized in the manner described.

Referring first to FIG. 5, it will be noted that the elongated track member 32 is formed as an extrusion from the material noted with the same being partially bowed upwardly relative to a planar base line 33. That is, the upper surface or bed of the track member is concave as formed. A generally circular plenum 34 extends longitudinally of the track member and defines a slot opening 36 in which the insert strip 1 is receivable when the track member is distorted from the position shown in FIG. 5 to the generally flat position shown in FIG. 6. Such distortion opens slot 36 to permit positioning of jet strip 1 therein and clamping thereof between the opposed track bed sections lying on opposite sides of the slot.

In that latter regard, the amount of bow imparted to the track segment initially is determined in accordance with the thickness of the insert strip 1 so that when the bow is removed from the track segment and the strip is inserted thereinto, a generally flat upper surface or bed 37 is provided over which the articles to be transported may pass without interference. When thus positioned, the jet strip is securely and frictionally held in place with its upper edge substantially coplanar with the bed of track member 32.

In each of FIGS. 3, 6 and 7 the insert strip is positioned in the track structture generally centrally thereof to effect movement of articles in the directions of the arrows shown therein. The illustrated assemblies are uni-directional track structures in accordance with the exit angle of the jet nozzles 9 in the respective strip inserts.

FIG. 8, however, illustrates a bi-directional track structure assembly in which a series of three jet strip inserts designated 41, 42 and 43 are positioned within an extruded track member 44 of the same general type shown in FIGS. 5 and 6. In that latter regard, however, the track member 44 of FIG. 8 is provided with three plenums 46, 47 and 48, which define jet insert receiving slots along their upper margins for receiving the three insert strips noted. The track member is initially bowed in the same manner as aforementioned track member 32 to effect frictional retention of the jet strips therein.

In that regard, the central insert strip 41 is positioned to extend generally axially of the track member 44 and is oriented therein with the exit ends of the jet nozzles 9 facing in the direction of the central arrow shown. The other jet insert strips 42 and 43 are positioned symmetrically on opposite sides of the central insert strip 41 and are oppositely oriented relative thereto so that their jet nozzles 9 are facing in the direction opposite from the jet nozzles of the center strip. Thus, jet strips 42 and 43 are capable of moving articles over the track bed in the direction of the arrows associated therewith in FIG. 8.

Each of the plenums 46, 47 and 48 is selectively connectable with a source of pressure fluid (not shown). Thus, by selective introduction of a bearing fluid into plenum 46 or plenums 47 and 48, an article positioned on the track structure may be moved either to the right or the left of FIG. 8 as desired. As a result of such selective introduction of fluid into the respective plenums, selective bi-directional movement of an article to be supported may be effected.

While several modifications of improved fluid bearing track structures have been illustrated and described, each possesses important advantages heretofore unknown including flexibility of use and lower costs resulting from the fact that track structures can be stocked in lengths in strip form and cut to desired lengths as required. Additional advantages result because complex machine tools for machining integral tracks are not required, track cleaning and maintenance is simplified because jet strip inserts may be removed and replaced as required, curved or circular tracks can be easily produced, and tracks of multiple widths can be made by selective positioning insert strips to effect track designs heretofore unknown.

By utilizing ejection molded or extruded track bed members as illustrated and described, additional flexibility of use is imparted to the system. The plenums illustrated form part of the track members and their ends must be plugged for sealing. However, such sealing may be easily effected with any suitable material without interferring with the basic function or positioning of the jet strip inserts therein as noted.

By first positioning the jet strip inserts in place in the track bed members, both the track segments and jet strips therein may be cut simultaneously to desired lengths, thereafter leaving only the sealing of the plenum ends and the operative positioning of the completed track structure assembly in the particular apparatus in which the same is to be used.

As noted previously, under many operating conditions the jet insert strip may be held or clamped frictionally in the illustrative fluid bearing track assemblies shown in the drawings. However, under certain operating conditions and situations, depending upon fluid pressures and such considerations, more positive means may be employed to insure against shifting or movement of the strips in their associated track structure assemblies.

To that end, mechanical strip retaining means may be provided in conjunction with the jet insert strip as seen in dotted lines in FIGS. 1 and 2. To that end, retaining tongue portions, designated 51, may be struck directly from the strip at regular intervals therealong. That is, by placing a strip, after chemical etching thereof, into a suitable fixture or holding jig, and bringing a suitable punch apparatus into contact with the strip, the tongues 51 may be formed by severing the strip between adjacent recesses 3 to deform portions of the strip laterally out of the plane thereof to define projecting shoulder portions 52 as seen in the dotted line showing of FIGS. 1 and 2.

Tongues 51 preferably are formed at suitable regular intervals along the strip with one such tongue between approximately each 10 recesses 3 being satisfactory. It should be understood that all such tongues may be bent out of the plane of the strip in the same direction or, alternatively, alternate tongues may be bent in opposite directions, depending upon the construction of the track structure assembly into which the strip is to be inserted.

In that latter regard, FIG. 4 shows in dotted lines the manner in which tongues 51 cooperate with other components of the track assembly to prevent lifting of the jet strip out of its operative position. As shown, the shoulder 52 of each tongue 51 engages the underside of a track bed component which defines the plenum to mechanically and positively hold the strip in its operative position.

A further jet insert strip modification is shown in FIG. 9. As described previously, under most conditions it is preferred to chemically etch recesses 3 the full distance through the strip as seen in FIG. 1. Such strips then may be used in producing bi-directional track assemblies in the manner seen in FIG. 8 by utilizing plural strips for that purpose.

However, the jet insert strip of this invention also lends itself well to bi-directional movement capability without requiring plural strips, as seen from the FIG. 9 modification. As seen in that figure, in which similar reference numerals primed identify similar strip portions previously identified, a single strip 1' may be provided with bi-directional capability by forming contoured fluid jet passages 3', 9' in each of the opposite sides of the strip, such passages being oppositely oriented so that their respective jet nozzle mouths 11' open in opposite directions relative to the top edge 7' of the strip.

Such a bi-directional strip is formed by etching recesses 3' and communicating jet grooves 9' slightly less than half way through the strip from each side thereof. Suitable mask layouts, formed as described previously, may be provided for that purpose in conjunction with the chemical etching procedure.

If the oppositely directed fluid passages shown in FIG. 9 need to be deeper than shown, that is, deeper than one half the thickness of the strip 1', the respective passages on each side of the strip may be spaced longitudinally farther apart than shown so that the passages on opposite sides of the strip will not overlie each other but will rather be intermediate each other to eliminate such overlap.

The bi-directional strip 1' of FIG. 9 may be used in a fluid bearing track assembly which has a plenum portion provided on each side thereof, as seen in solid and dotted lines in FIG. 4, or as seen in FIGS. 5 and 6. Thus bearing fluid may be selectively introduced into either of the opposed plenums and then into the fluid passages on either side of the strip 1' to effect article movement selectively in opposite directions as required.

Of course, the modified strip 1' may also be used in a uni-directional track assembly having only a single plenum provided on one side of the strip in communication with the fluid passages at such one side.

Having thus made a full disclosure of this invention and preferred embodiments of the improved jet track structure assembly and production and fabricating methods employed therewith, reference is directed to the appended claims for the scope of protection to be afforded thereto.

I claim:

1. A fluid bearing track assembly for transporting articles on a fluid bearing therealong comprising
   A. a track bed forming structure, and
   B. a thin flexible jet strip insert clamped in said structure in operative communication with a plenum chamber extending along said structure, said jet strip insert having
      a. a series of directional fluid passages extending therethrough which receive fluid from said plenum and direct the same through said structure to emanate from the upper surface of said structure for supporting and moving articles therealong under controlled conditions.

2. The assembly of claim 1 in which said strip insert is positioned in said track bed structure to extend generally longitudinally axially thereof.

3. The assembly of claim 1 in which said assembly includes more than one of said jet strip inserts clamped therein, each of which has fluid passages therein in communication with said plenum.

4. The assembly of claim 3 in which said jet strip inserts are symmetrically arranged relative to the longitudinal axis of said track bed structure.

5. The assembly of claim 1 in which said track bed structure includes a portion which defines a non-straight path for changing direction of movement of articles extending therealong.

6. The assembly of claim 5 in which said non-straight track bed portion is generally arcuate in configuration.

7. The assembly of claim 1 in which said track bed structure is defined by
   a. two opposed track sections which define a slot therebetween in communication with said plenum,
   b. said jet strip insert being received within said slot.

8. The assembly of claim 1 in which said track bed structure is defined by
   a. a single track section formed of resilient flexible material having a slot therein in communication with said plenum,
   b. said jet strip insert being positioned within said slot and frictionally engaged therein.

9. The assembly of claim 8 in which said track section is extruded with a concave configuration in transverse cross-section so that said slot is initially closed, said track section being bendable to open said slot to receive said insert therein after which the natural resilience of said section maintains said insert in place.

10. The assembly of claim 1 in which said assembly includes

C. at least two jet strip inserts clamped therein each of which has directional fluid passages therein
   a. said jet strips being identical in construction but oppositely oriented in said track bed structure so that bearing fluid emanating therefrom is oppositely directed whereby bi-directional article movement capability is imparted to said assembly,
   b. each of said jet strips being operatively connected with a fluid plenum for effecting selective fluid introduction into said passages of said respective jet strips.

11. The assembly of claim 10 in which three jet strip inserts are positioned in said track bed structure one of which is positioned centrally thereof with its fluid passages extending in a first direction and the other two of which are positioned symmetrically on opposite sides of said central strip with their fluid passages extending in the opposite direction.

12. The assembly of claim 1 in which said jet strip insert is formed from a chemically etchable material selected from the group including phosphor bronze, brass, beryllium copper and stainless steel.

13. The assembly of claim 1 in which said jet strip insert fluid passages are defined by
   i. recesses extending laterally therethrough in communication with said plenum, and
   ii. jet nozzle grooves extending from said recesses to an edge of said strip insert,
   iii. said nozzle grooves tapering in width from said recesses toward said strip edge.

14. The assembly of claim 13 in which said jet nozzle grooves are generally arcuately curved in configuration.

15. The assembly of claim 13 in which said jet nozzle grooves extend laterally only partially through said insert strip.

16. The assembly of claim 13 in which said jet nozzle grooves open onto the upper surface of said track bed structure at an angle within the range of approximately 15° to approximately 25°.

17. The assembly of claim 13 in which said jet nozzle grooves are each defined by side walls formed as arcs of circles having different centers.

18. The assembly of claim 1 in which said jet strip insert has bi-directional article movement capability provided by
   b. a second series of directional fluid passages extending therethrough on a side thereof opposite from said first mentioned series of passages,
   c. said second series of passages being oppositely oriented relative to said first mentioned series,
   d. each of said series of passages extending laterally only part way through said insert strip,
   e. said insert strip being positioned in said assembly with each of said series of passages in communication with a separate plenum so that bearing fluid may be selectively introduced into either of said series of passages.

19. The assembly of claim 1 in which said strip further includes
   b. retaining tongues projecting laterally therefrom for engagement with predetermined portions of said track bed forming structure for positively maintaining said strip in place in said assembly.

\* \* \* \* \*